(No Model.)

A. W. NORTON.
LATHE.

No. 255,011. Patented Mar. 14, 1882.

Witnesses.
L. H. Connor.
John F. C. Prindivert

Inventor.
Alexander W. Norton.
by Crosby & Gregory
Attys.

N. PETERS. Photo-Lithographer, Washington, D. C.

UNITED STATES PATENT OFFICE.

ALEXANDER W. NORTON, OF BOSTON, MASSACHUSETTS, ASSIGNOR TO THE AMERICAN TOOL AND MACHINE COMPANY, OF SAME PLACE.

LATHE.

SPECIFICATION forming part of Letters Patent No. 255,011, dated March 14, 1882.

Application filed January 7, 1882. (No model.)

*To all whom it may concern:*

Be it known that I, ALEXANDER W. NORTON, of Boston, county of Suffolk, State of Massachusetts, have invented an Improvement in Lathes, of which the following description, in connection with the accompanying drawings, is a specification.

This invention has for its object to economize time of the workman when the lathe is to be changed to cut a thread of different pitch. Heretofore in screw-chasing lathes the follower has been composed of a metal block adjustably held in a socket of an arm extended from the slide-rod, which is connected with and gives horizontal movement to the tool-holding carriage. This follower has usually been made as an oblong block having at its ends threads of different pitch suitable to engage the threads of a suitable rotating but removable sleeve actuated usually from the lathe-spindle. A follower as ordinarily made cannot be used for cutting more than two various pitches of thread—one end is prepared or cut for one pitch and the other end for another pitch. Instead of this oblong block-like form of follower, adapted to be slid out from and into a socket in the said arm, I have produced a rotating follower having two or more series of threads of different pitch, either series of which, by turning the follower about its center on the said arm, may be brought to the front to engage as a half-nut, or as a third-part nut, the threads of the usual rotating screw-threaded sleeve to be described, so that the follower, to enable it to feed the tool-holding carriage at the required speed with relation to the speed of the lathe-spindle, has only to be partially rotated about its axis.

Figure 1:
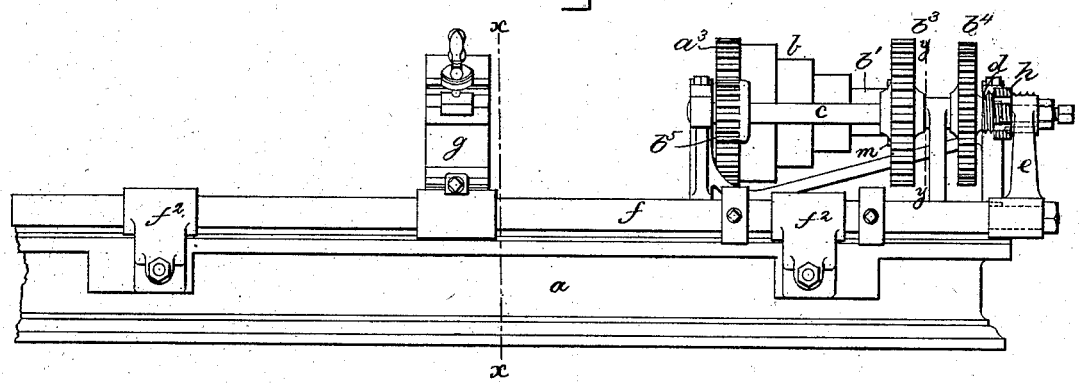
Figure 4:
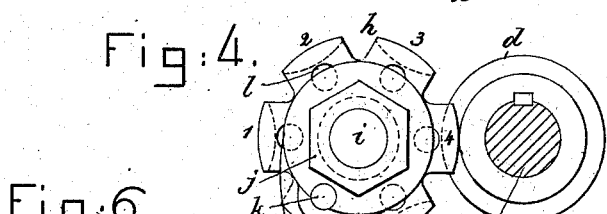
Figure 6:
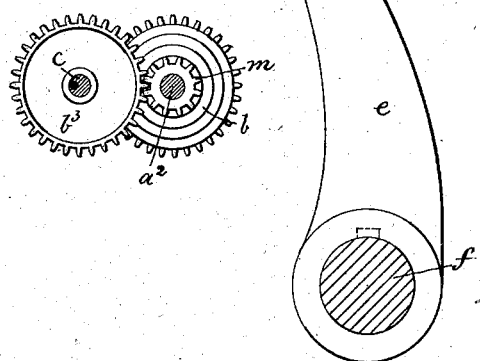
Figure 2:
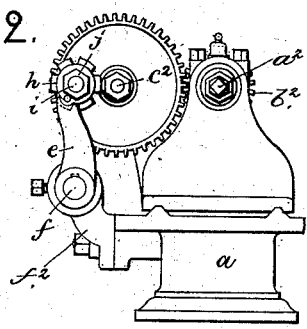
Figure 3:
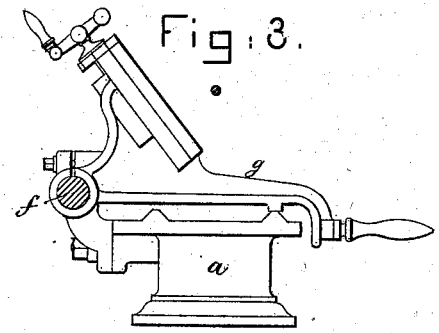

Figure 1 represents, in side elevation, a sufficient portion of a screw chasing lathe to illustrate my invention; Fig. 2, a right-hand end view of Fig. 1; Fig. 3, a section on the dotted line $x\,x$; Fig. 4, an enlarged detail, showing the follower and its carrying-arm in another position; and Fig. 6, a sectional detail on the dotted line $y\,y$, Fig. 1.

The lathe-frame $a$ has suitable standards for the bearings of the lathe-spindle $a^2$. The large gear $a^3$ is fast on spindle $a^2$, but the cone-pulley $b$ is loose thereon. The sleeve $b'$, extended from one end of the cone-pulley, is provided with a pinion, $m$, such as common to all back-geared lathes. The pinion $m$ engages the back gear, $b^3$, fast on the hollow shaft or spool $c$, common to lathes, and drives the said spool so that its pinion $b^5$, in engagement with the gear $a^3$, referred to, drives the lathe-spindle at its slowest working speed.

The cone-pulley $b$ will have the usual devices to enable the gear $a^3$ to be connected with and be driven directly by it at the fastest working-speed of the lathe, at which time the back gears, $b^3\,b^5$, are by the usual eccentric shaft within spool $c$ disengaged from the spindle-gears $a^3$ and $m$.

The lathe-spindle has fast upon it a pinion, $b^2$, which engages the independent loose gear $b^4$, with which is connected, in any usual or suitable way, the detachable threaded sleeve $d$, so that the said threaded sleeve may be readily changed for another sleeve having a thread of a different pitch. The slide-rod $f$, guided in bearings $f^2$ and connected with and so as to move the usual tool-holding carriage, $g$, has also fastened to it the arm $e$, upon which my improved follower $h$ is pivoted. The parts $a$, $a^2$, $a^3$, $b$, $b'$, $b^2$, $b^3$, $b^4$, $b^5$, $d$, $e$, $f$, $f^2$, $g$, and $m$ are all common to other lathes.

Whenever it is desired to change the lathe to make on an article a thread of a pitch different from that for which the lathe is then set the rotating sleeve or threaded part $d$ will be removed from its engagement with the independent loose gear $b^4$, and another sleeve having threads suitable to produce a thread of the desired pitch will be substituted for it.

Figure 5:
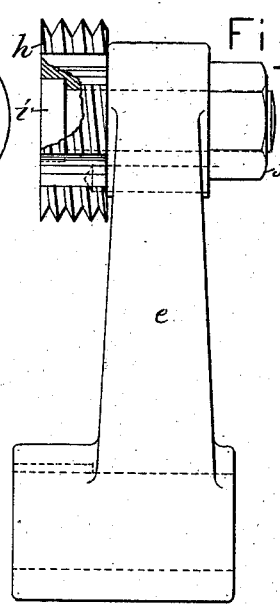

My improved pivoted or rotating follower $h$ is held upon the arm $e$ by a bolt, $i$, extended through the said arm. The head of bolt $i$ is sunk into the side of the follower, as shown in dotted lines, Fig. 5, and the nut $j$ draws the bolt in place.

The follower herein shown has a series of projections, 1 2 3 4 5 6, each of which is provided with a series of screw-threads to engage the threads of the particular sleeve $d$ which is to be used, each projection having a series of threads of a different pitch from any other projection of the series.

To bring to the front a projection of the follower having upon it a suitable thread to cooperate with the sleeve $d$ to be used, and thus insure the movement of the rod $f$ and tool-holder at the speed necessary to produce on the thing being revolved by the lathe-spindle a thread of a required pitch, it is only necessary to turn the follower about its center or bolt $i$ and fasten it in place. For this latter purpose the follower is provided at one side with a series of recesses or notches, $l$, one of which is engaged by the pin or projection $k$ when the follower is in working position, and the nut $j$ is turned up snugly against the arm $e$, as in Fig. 5. This said pin and the recess $l$ entered by it form a locking device for the follower.

The follower may have any desired number of threaded projections.

I claim—

1. The tool-carrier, slide-rod to move it, and the follower-carrying arm, combined with a rotating follower adapted to engage the screw-threaded sleeve or portion $d$, substantially as and for the purpose described.

2. The arm $e$ and rotating follower, having screw-threads of different pitch, combined with the nut and bolt and locking device to hold the follower firmly in adjusted position, substantially as and for the purpose described.

In testimony whereof I have signed my name to this specification in the presence of two subscribing witnesses.

ALEXANDER WM. NORTON.

Witnesses:
  GEO W. GREGORY,
  B. J. NOYES.